(12) United States Patent
Okamuro et al.

(10) Patent No.: US 6,232,595 B1
(45) Date of Patent: May 15, 2001

(54) POSITION DETECTING APPARATUS

(75) Inventors: Takashi Okamuro; Hirokazu Sakuma; Yoichi Ohmura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,312

(22) Filed: Jul. 10, 2000

Related U.S. Application Data

(63) Continuation of application No. PCT/JP99/01088, filed on Mar. 5, 1999.

(30) Foreign Application Priority Data

Nov. 9, 1998 (JP) .................................................. 10-317442

(51) Int. Cl.⁷ ...................................................... G01D 5/34
(52) U.S. Cl. ......................... 250/231.16; 341/13; 356/375
(58) Field of Search ........................ 250/231.14, 231.16; 341/13, 31; 356/375

(56) References Cited

U.S. PATENT DOCUMENTS 5,444,240 * 8/1995 Nakayama ........................... 356/375
6,124,588 * 9/2000 Hagl et al. ......................... 250/231.14

FOREIGN PATENT DOCUMENTS

| 4-359107 | 12/1992 | (JP) | ................................ G01B/21/00 |
| 5-26686 | 2/1993 | (JP) | ................................ G01D/5/36 |
| 7-218288 | 8/1995 | (JP) | ................................ G01D/5/245 |
| 2501227 | 3/1996 | (JP) | ................................ G01D/5/249 |
| 8-261794 | 10/1996 | (JP) | ................................ G01D/5/36 |

* cited by examiner

Primary Examiner—Stephone B. Allen
(74) Attorney, Agent, or Firm—Sughrue, Mion, Zinn, Macpeak & Seas, PLLC

(57) ABSTRACT

In a position detecting apparatus which detects an absolute position by A/D converting sinusoidal and cosinusoidal signals and performing interpolation, a phase error between the signals which is caused by movement of a detection object during the A/D conversion is corrected, thereby enabling sample hold circuits which have been necessary for maintaining the synchronism of analog signals to be omitted, so as to realize the cost reduction and miniaturization. This is enabled also in an apparatus of high resolution. Position data at requests of the last and preceding times are stored into a RAM 12. On the basis of the position data, a CPU 10 predicts the amount of a phase shift of another signal due to movement during A/D conversion of one signal, corrects the predicted phase shift amount, and then calculates the position data.

10 Claims, 13 Drawing Sheets

POSITION DETECTING APPARATUS

This is a Continuation of PCT Application No. PCT/JP99/01088 filed on Mar. 5, 1999, which claims benefit of priority based on Japanese Application No. P. Hei. 10-317442 filed Nov. 9, 1998.

BACKGROUND OF THE INVENTION

1. Field of the Invention

The present invention relates to a position detecting apparatus of a rotary type or linear type which detects a position of a machine tool or the like.

2. Description of the Related Art

A conventional position detecting apparatus, e.g., a position detector will be described by taking an optical encoder as an example. As a method of obtaining an absolute encoder of high resolution, known is a method which is disclosed in, for example, JP-B-5-65827. In the method, an analog signal such as a sinusoidal wave or a triangular wave which is output in accordance with the rotation angle, and an analog signal having a predetermined phase difference with respect to the analog signal are A/D converted, and interpolation is performed by a calculating process. FIG. 11 is a diagram of the configuration of a conventional encoder according to the method.

Referring to the figure, the case where an amplifying section 5 has only two amplifying circuits will be described. With respect to light emitted from a light emitting section 1, the amount of light reaching a light receiving section 3 is changed by a screen plate 2 attached to a position detection object. The light receiving section 3 generates a signal which is proportional to the amount of the reaching light.

When the slit shape of the screen plate 2 is appropriately set and a light receiving element 4A and a light receiving element 4B are appropriately arranged, the light receiving element 4A and the light receiving element 4B generates sinusoidal signals which are different in phase from each other by 90° (hereinafter, such signals are referred to as a SIN signal and a COS signal, respectively).

These signals are amplified by an amplifying section 5, simultaneously held by a sample hold circuit 6 in synchronization with a request signal from an external controller, and then input from the sample hold circuit 6 into a multiplexer 8 of a one-chip microcomputer 7. Since the analog signals are simultaneously held by the sample hold circuit 6, the synchronism of the SIN signal and the COS signal is maintained.

The two hold outputs from the sample hold circuit 6 are sequentially selected by the multiplexer 8, and converted in sequence into a digital data by an A/D converter 9.

The converted digital data are converted into position data by a CPU 10, and output from a transmitting and receiving circuit 14 to the external controller.

The CPU 10 calculates a TAN signal (tangent signal) from the SIN signal (sine signal) and the COS signal (cosine signal) based on the converted digital data, and obtains a position data from a $TAN^{-1}$ table which is stored in a ROM 11.

The reference numeral 13 denotes an output circuit which outputs a sample hold signal to the sample hold circuit 6 in synchronization with the request signal from the external controller, and 12 denotes a RAM which stores data required for calculation.

Next, the case where the amplifying section 5 has amplifying circuits, the number of which is even and equal to or greater than four will be described with reference to FIG. 11. In order to obtain an absolute encoder of high resolution, the screen plate 2 and the light receiving section 3 are configured so that plural pairs of the SIN signal and the COS signal are output at different cycles. The sample hold circuit 6 simultaneously holds each pair of the SIN signal and the COS signal, and then inputs the signals into the one-chip microcomputer 7.

As a result of the same process as that described above, an electrical angle data is obtained for each pair of the SIN signal and the COS signal.

The CPU 10 weights each of the electrical angle data for each cycle, and then superposes the data to calculate an absolute data.

FIG. 12 is a view showing a superposition method which has 9-bit interpolation resolution, and which is used in the case where an electrical angle data of one cycle per revolution (hereinafter, referred to as 1-wave data), an electrical angle data of 16 cycles per revolution (hereinafter, referred to as 16-wave data), and an electrical angle data of 256 cycles per revolution (hereinafter, referred to as 256-wave data) are superposed.

In the 16-wave data, a data weight with respect to the 1-wave data is $1/16$ ($1/2^4$), and, in the 256-wave data, a data weight with respect to the 1-wave data is $1/256$ ($1/2^8$) Therefore, the 16-wave data is combined with being shifted by 4 bits with respect to the 1-wave data in the direction of the LSB, and the 256-wave data is combined with being shifted by 8 bits with respect to the 1-wave data in the direction of the LSB. When two 9-bit data are superposed with shifting one of the data by 4 bits, the 5 bits are superposed.

In each data, higher bits are superior in data reliability than lower bits. In synthesis, therefore, higher bits of the 16-wave data are used as the 5 bits in which the 1-wave data and the 16-wave data are superposed, and higher bits of the 256-wave data are used as the 5 bits in which the 16-wave data and the 256-wave data are superposed.

FIG. 13 is a timing chart showing the operation of a conventional absolute encoder. As shown in the figure, the sample hold circuit 6 simultaneously holds one pair of the SIN signal and the COS signal, or plural pairs of the SIN signal and the COS signal of different cycles in synchronization with a request signal from an external apparatus, and sequentially performs A/D conversions.

When the A/D conversions are completed, the CPU 10 calculates a position data on the basis of results of the conversions, and at a time $(T_n + T_d)$ transmits serially a position data $\theta(T_n)$ at a time $T_n$ to the external apparatus via the transmitting and receiving circuit 14.

As described above, in the conventional apparatus, a long time period must elapse from the holding of analog signals to the transmission of a position data, and hence the position data is output with a delay corresponding to $T_d$. In the case where a position detection object is moved (rotated) at a high speed, it is impossible to obtain satisfactory servo control characteristics because of the delay time.

As a method of correcting such a delay time, known is a method which is disclosed in, for example, JP-A-8-261794. In the method, a moving distance of a position detection object during a delay time is predicted by using a position data which is sampled at the present time, and position data which are sampled at the last and preceding times. The predicted moving distance is added to the position data at the present time, and a result of the addition is output.

According to the conventional position detecting apparatus described above, miniaturization and reduction of the cost can be realized by using a one-chip microcomputer incorporated in the A/D converter. A one-chip microcomputer of a low cost is usually configured so that one A/D converter is incorporated, and a multiplexer is disposed in the input of the converter to increase analog input channels, and hence cannot simultaneously A/D convert plural analog inputs. In the case where the synchronism of plural analog signals must be maintained, therefore, it is required to prepare sample hold circuits, the number of which is equal to that of signals.

In the case where a position detection object is moved, when no sample hold circuit is used, with respect to a data which is first A/D converted, another data is a data at the timing when movement for the time period required for the A/D conversion is performed. A position data which is calculated by using these data contains an error. In the case where a position detection object is moved at a high speed, particularly, such an error becomes large and servo control characteristics are largely impaired.

In the case where electrical angle data of different cycles are to be combined with one other, the synchronism among the electrical angle data of each cycles is not maintained, and hence the electrical angle data cannot be correctly combined. This phenomenon is remarkable in the case where a position detection object is moved at a high speed.

A sample hold circuit is configured by an analog switch, a capacitor for holding a signal, and a voltage follower circuit. Therefore, in the case where plural pairs of a SIN signal and a COS signal of different cycles are required, particularly, the number of parts is increased, thereby impeding miniaturization and reduction of the cost.

In a conventional position detecting apparatus, an amplifying section is configured so as to have an integrator in order to attain stability of a circuit, and, in a sample hold circuit, a low-pass filter is configured in a circuit in order to charge a capacitor.

In the case where a position detection object is moved (rotated) at a high speed, the frequency of an analog signal is high. Therefore, a phase lag due to the integrator and the low-pass filter increases the phase shift among plural electrical angle data of different cycles.

As a result, there arises a problem in that plural electrical angle data of different cycles cannot be correctly combined with one other.

For example, a case will be considered in which, in a signal configuration consisting of a sinusoidal wave of one cycle per revolution (referred to as 1 SIN), a cosinusoidal wave of one cycle per revolution (referred to as 1 COS), a sinusoidal wave of 16 cycles per revolution (referred to as 16 SIN), a cosinusoidal wave of 16 cycles per revolution (referred to as 16 COS), a sinusoidal wave of 256 cycles per revolution (referred to as 256 SIN), a cosinusoidal wave of 256 cycle per revolution (referred to as 256 COS), a sinusoidal wave of 2048 cycles per revolution (referred to as 2048 SIN), and a cosinusoidal wave of 2048 cycles per revolution (referred to as 2048 COS), the amplifying circuits of the amplifying section 5 are configured by a resistor $R_a$=100 kΩ and a capacitor $C_a$=100 pF, and, in the sample hold circuit, low-pass filters of $R_s$=100Ω and a capacitor $C_s$=1000 pF are configured. In the case where a rotary motor is rotated at 6000 rpm, a phase shift which will be described below is produced.

When the frequencies of 1 SIN and 1 COS are indicated by $f_1$, the frequencies of 16 SIN and 16 COS are indicated by $f_{16}$, the frequencies of 256 SIN and 256 COS are indicated by $f_{256}$, and the frequencies of 2048 SIN and 2048 COS are indicated by $f_{2048}$, the followings are attained:

$f_1$=6000/60=100.0 (Hz)
$f_{16}$=(6000/60)·16=1.6 (kHz)
$f_{256}$=(6000/60)·256=25.6 (kHz)
$f_{2048}$=(6000/60)·2048=204.8 (kHz).

The phase lag (the phase lag at the timing when input to the multiplexer 8 is performed) $\phi_d$ in an analog signal processing section is expressed by:

$$\phi_d = -\tan^{-1}(2\pi f \cdot C_a \cdot R_a) - \tan^{-1}(2\pi f \cdot C_s R_s).$$

When the phase lag of 1 SIN and 1 COS is indicated by $\phi_1$, the phase lag of 16 SIN and 16 COS is indicated by $\phi_{16}$, the phase lag of 256 SIN and 256 COS is indicated by $\phi_{256}$, and the phase lag of 2048 SIN and 2048 COS is indicated by $\phi_{2048}$, the followings are attained:

$$\phi_1 = -\tan^{-1}(2\pi \cdot 100 \cdot 100 \cdot 10^3 \cdot 100 \cdot 10^{-12}) - \tan^{-1}(2\pi \cdot 100 \cdot 100 \cdot 1000 \cdot 10^{-12}) = -0.396°$$

$$\phi_{16} = -\tan^{-1}(2\pi \cdot 1600 \cdot 100 \cdot 10^3 \cdot 100 \cdot 10^{-12}) - \tan^{-1}(2\pi \cdot 1600 \cdot 100 \cdot 1000 \cdot 10^{-12}) = -5.80°$$

$$\phi_{256} = -\tan^{-1}(2\pi \cdot 25600 \cdot 100 \cdot 10^3 \cdot 100 \cdot 10^{-12}) - \tan^{-1}(2\pi \cdot 25600 \cdot 100 \cdot 1000 \cdot 10^{-12}) = -59.05°$$

$$\phi_{2048} = -\tan^{-1}(2\pi \cdot 204800 \cdot 100 \cdot 10^3 \cdot 100 \cdot 10^{-12}) - \tan^{-1}(2\pi \cdot 204800 \cdot 100 \cdot 1000 \cdot 10^{-12}) = -92.88°$$

When the phase lag in a signal of 2048 cycles per revolution (hereinafter, referred to as 2048-cycle signal) is reduced to a signal of 256 cycles per revolution (hereinafter, referred to as 256-cycle signal), $$\phi_{2048}/8 = -92.88/8 = -11.61°.$$

Therefore, the 256-cycle signal lags the 2048-cycle signal by:

$$\phi_{256} - (-11.61) = -59.05 - (-11.61) = -47.44°$$

(corresponding to the 256-cycle signal).

The phase variation which is allowable for combining position data is:

$$(256/2048) \cdot 360° = 45°$$

Therefore, the lag exceeds the allowable phase variation, and the position data cannot be correctly combined.

SUMMARY OF THE INVENTION

The invention has been conducted in order to solve the above-discussed problems. It is an object of the invention to provide a position detecting apparatus that outputs a correct position data which is free from an error even when a position detection object is moved at a high speed, without using sample hold circuits which are equal in number to analog signals, and that is small and economical.

The position detecting apparatus of the invention comprises: signal generating means for generating sinusoidal and cosinusoidal signals in response to movement of a position detection object; A/D converting means for converting the sinusoidal and cosinusoidal signals which are generated by the signal generating means, into digital data on the basis of reception of a request signal from an external apparatus; and calculating means for assuming an amount of a phase shift between a digital data of the sinusoidal signal and a digital data of the cosinusoidal signal, the phase shift being produced by movement of the position detection object during A/D conversion performed by the A/D converting means, on the basis of a movement velocity at a last time which is calculated from a difference between position data in request receptions at a twice preceding time and a once preceding time, for correcting a phase of one of the digital data of the sinusoidal signal and the digital data of the cosinusoidal signal, and for calculating a position data at a present time on the basis of the digital data the phase of one of which is corrected. Therefore, an effect is attained that, even when the position detection object is moved at a high speed, a correct position data can be obtained.

Furthermore, the calculating means assumes the amount of the phase shift for each pair by using movement acceleration at the last time which is calculated from a difference between movement velocity at a time immediately before the last time, and the movement velocity at the last time, the movement velocity at the time immediately before the last time being calculated from a difference between position data in request receptions at a thrice preceding time and the twice preceding time. Therefore, a further effect is attained that, even during a period when the position detection object is accelerated or decelerated, a correct position data of high resolution can be obtained.

The apparatus comprises: signal generating means for generating plural signal pairs consisting of a sinusoidal signal and a cosinusoidal signal, at different cycles in response to movement of a position detection object; A/D converting means for sequentially converting the signals of the signal pairs into digital data on the basis of reception of a request signal from an external apparatus; and calculating means for correcting a phase difference between the digital data of the signal pairs on the basis of a movement velocity at a last time which is calculated from a difference between position data in request receptions at a twice preceding time and a once preceding time, the phase difference being produced during an A/D conversion time of one signal of the signal pair, for calculating a first electrical angle data on the basis of the digital data of the corrected signal pair, for calculating a second electrical angle data on the basis of the movement velocity at the last time, the second electrical angle data indicating a moving distance of a position detection object during a time period from reception of the request signal to A/D conversion of the signal pair, for performing a process of obtaining a third electrical angle data on the basis of the first and second electrical angle data, on each of the signal pairs, and for calculating a position data at a present time on the basis of a result of the process. Therefore, an effect is attained that, even when the position detection object is moved at a high speed, a correct position data of high resolution can be obtained.

Furthermore, the calculating means performs a weighting process on each of the calculated third electrical angle data in accordance with the cycle, and superposes results of the processes to calculate the position data at the present time. Therefore, an effect is attained that, even when the position detection object is moved at a high speed, a correct position data of high resolution can be obtained.

Furthermore, the calculating means assumes the amount of the phase shift for each pair by using movement acceleration at the last time which is calculated from a difference between movement velocity at a time immediately before the last time, and the movement velocity at the last time, the movement velocity at the time immediately before the last time being calculated from a difference between position data in request receptions at a thrice preceding time and the twice preceding time. Therefore, a further effect is attained that, even during a period when the position detection object is accelerated or decelerated, a correct position data of high resolution can be obtained.

Furthermore, the calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and calculates the position data at the present time by further using a result of the prediction. Therefore, an effect is attained that a correct position data of a higher accuracy can be obtained.

Furthermore, the calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and movement acceleration at the last time which is calculated from a difference between movement velocity at a time immediately before the last time, and the movement velocity at the last time, the difference between movement velocity at the time immediately before the last time being calculated from a difference between position data in request receptions at a thrice preceding time and the twice preceding time, and calculates the position data at the present time by further using a result of the prediction. Therefore, an effect is attained that, even during a period when the position detection object is accelerated or decelerated, a correct position data of a higher accuracy can be obtained.

DETAILED DESCRIPTION OF THE PRESENT INVENTION (Embodiment 1 of the Invention)

Figure 1:
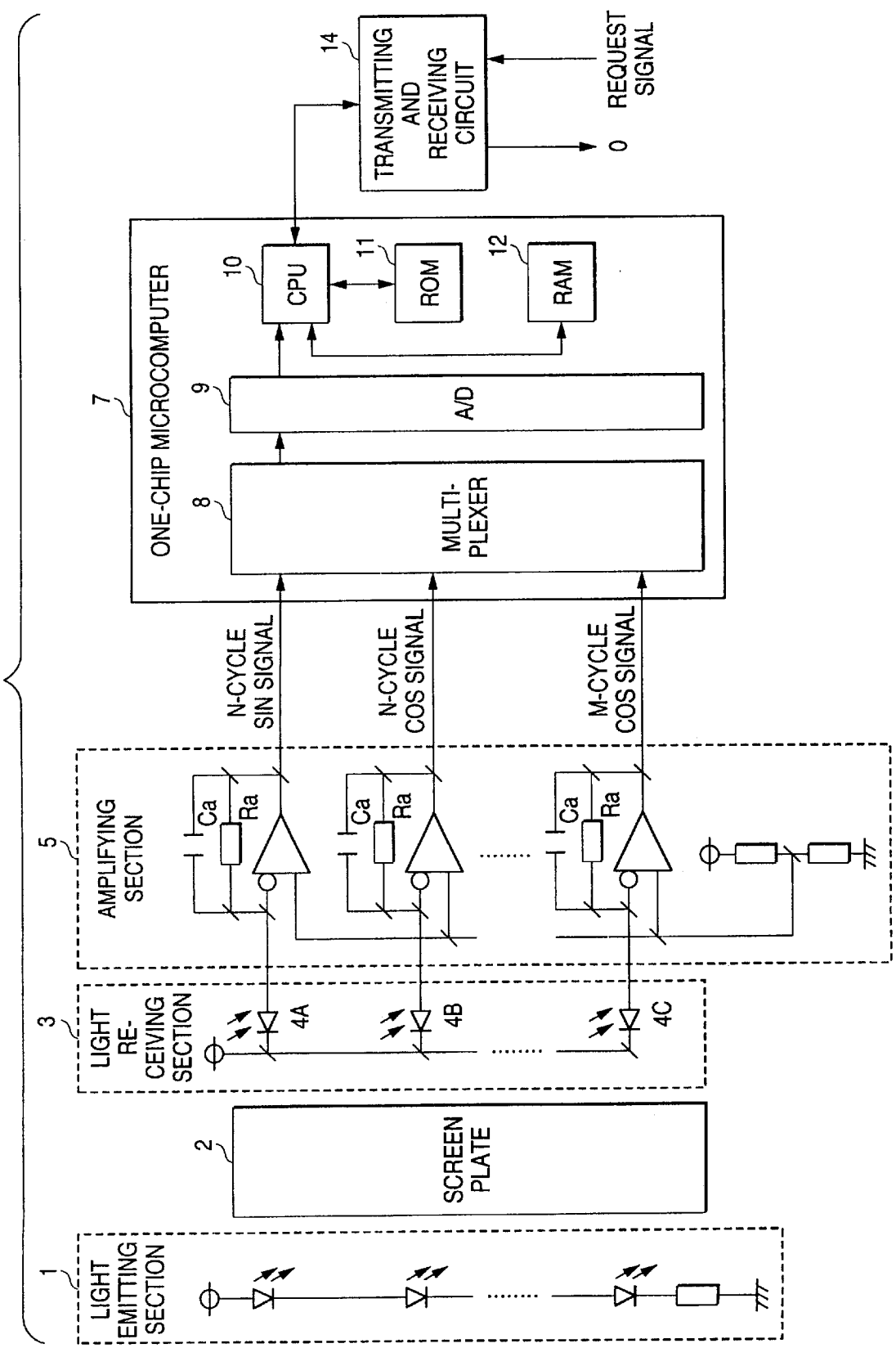
FIG. 1 is a block diagram showing a position detector according to Embodiments 1 to 6 of the invention.

FIG. 1 is a block diagram of a position detector according to Embodiment 1 of the invention. In the figure, 12 denotes a RAM which stores calculated position data $\theta(T_{n-1})$, $(T_{n-2})$, and $(T_{n-3})$.

The reference numeral 11 denotes a ROM which stores a time period $T_{ad}$ (known) which is required for A/D converting one channel necessary for obtaining a position data from digital data, a cycle $T_r$ (known) of a request from an external apparatus, a COS table, a TAN table, and a $TAN^{-1}$ table which are required for a phase correction, and a delay time constant $\tau N$ (N is an integer) which causes a delay of an analog signal of each cycle.

Figure 2:
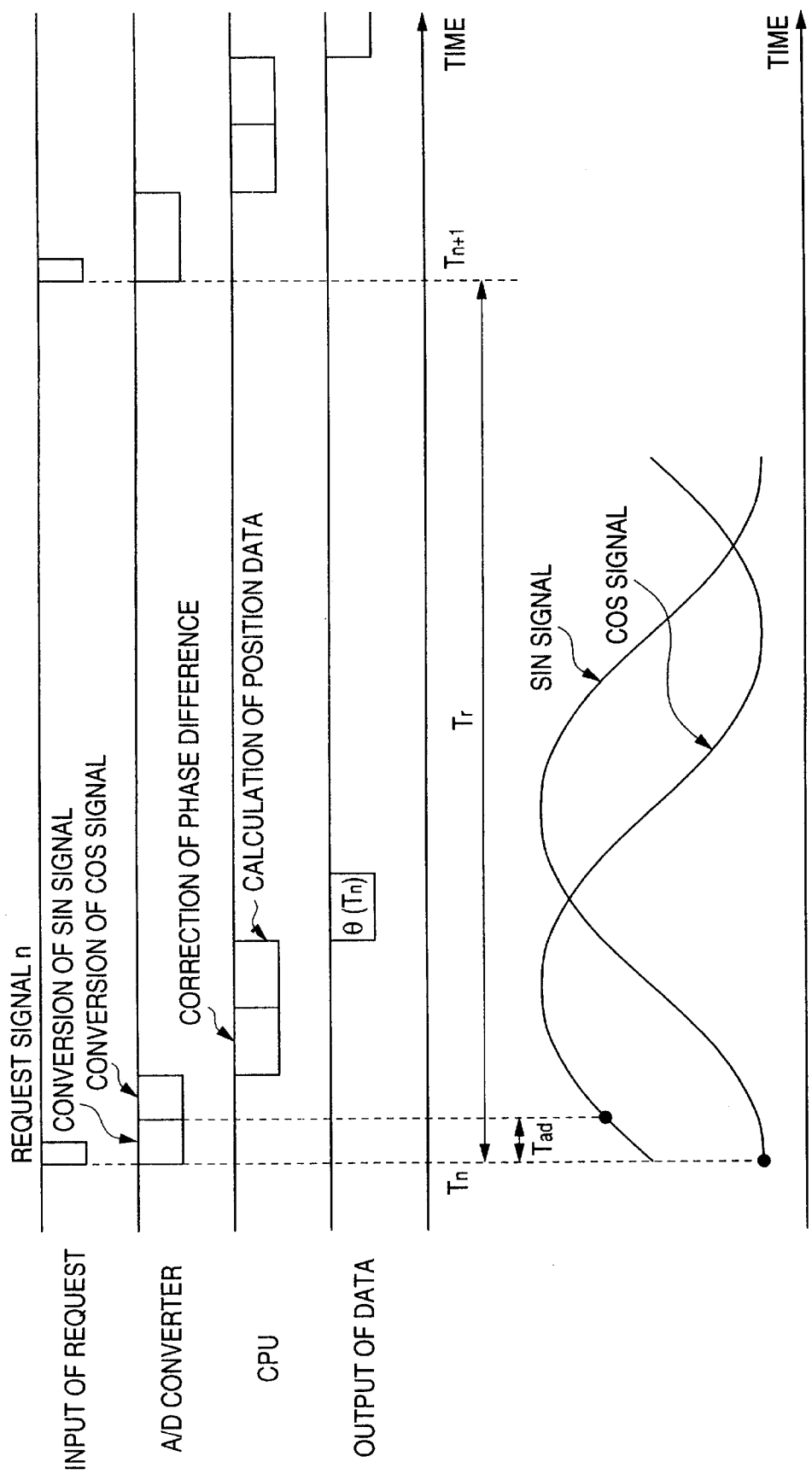
FIG. 2 is a timing chart showing the operation of the position detector according to Embodiments 1 and 2 of the invention.

FIG. 2 is a timing chart showing the operation of the position detector shown in FIG. 1. The figure shows the case where A/D conversion is performed in the sequence of a SIN signal and a COS signal. This sequence may be reversed.

A digital data of the SIN signal is a data at a time $T_n$ or SIN $\theta(T_n)$. By contrast, a digital data of the COS signal is a data at a time $(T_n+T_{ad})$ or $COS(\theta(T_n)+\theta(T_{ad}))$.

A COS data at a time Tn or COS $\theta(T_n)$ is calculated by a phase correcting process which will be described below.

Figure 3:
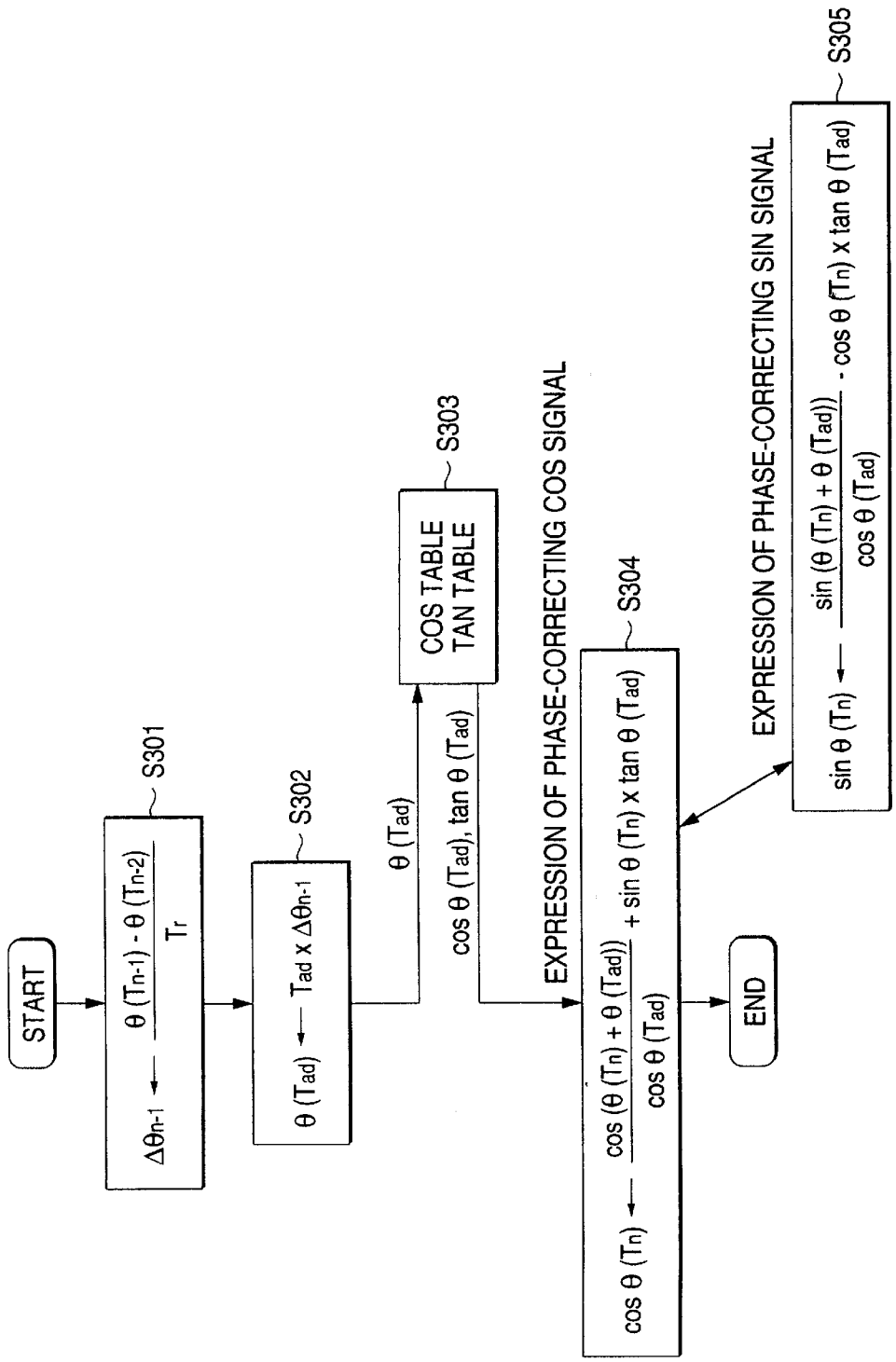
FIG. 3 is a flowchart showing the operation of a phase correction in the position detector according to Embodiment 1 of the invention.

FIG. 3 is a flowchart of the phase correcting process. Referring to the figure, a movement velocity $\Delta\theta_{n-1}$ at the last time between requests is calculated from a position data $\theta(T_{n-2})$ which is produced at the request at a twice preceding time, a position data $\theta(T_{n-1})$ which is produced at the request at a once preceding time, and the cycle $T_r$ of a request from the external apparatus (step S301).

Next, a moving distance $\theta(T_{ad})$ during A/D conversion of the SIN signal is predicted from $\Delta\theta_{n-1}$ and the time period $T_{ad}$ which is required for A/D converting one channel (step S302).

With using $\theta(T_{ad})$ as an address, COS $\theta(T_{ad})$ is taken out from the COS table, and TAN $\theta(T_{ad})$ is taken out from the TAN table (step S303).

Next, COS $\theta(T_n)$ is calculated from SIN $\theta(T_n)$, COS $\theta(T_{ad})$, and TAN $\theta(T_{ad})$ (step S304).

The calculation expression can be easily derived from the following theorem of trigonometric functions:

$$COS(\theta(T_n)+\theta(T_{ad}))=COS\ \theta(T_n)\cdot COS\ \theta(T_{ad})-SIN\ \theta(T_n)\cdot SIN\ \theta(T_{ad}).$$

In the case where the COS signal is to be first A/D converted and the SIN signal is to be then A/D converted, a correction can be similarly performed by processing step S301 to step S303 in the same manner as those described above, and implementing step S305 in place of step S304 in order to perform a phase correcting process on the SIN signal.

As a result of the above phase correcting process, the phase lead of another signal due to movement of the position detection object during A/D conversion of one signal is corrected, and a correct position data can be calculated.

Moreover, because of the phase correcting process, it is not required to maintain the synchronism of the sinusoidal signal and cosinusoidal signal. Therefore, it is not necessary to use sample hold circuits which are equal in number to analog signals and which are necessary in the conventional art, and a position detecting apparatus that is small and economical can be obtained.

(Embodiment 2 of the Invention)

In the phase correcting process shown in Embodiment 1 of the invention, the movement velocity $\Delta\theta_{n-1}$ is set to be constant, and the position moving distance $\theta(T_{ad})$ during A/D conversion of one signal is predicted. In the case where the request cycle is sufficiently short, this prediction is sufficient. During acceleration or deceleration of the position detection object, when the value of acceleration or deceleration is larger as compared with the request cycle, prediction of a high accuracy cannot be performed, and a sufficient accuracy cannot be obtained.

Figure 4:
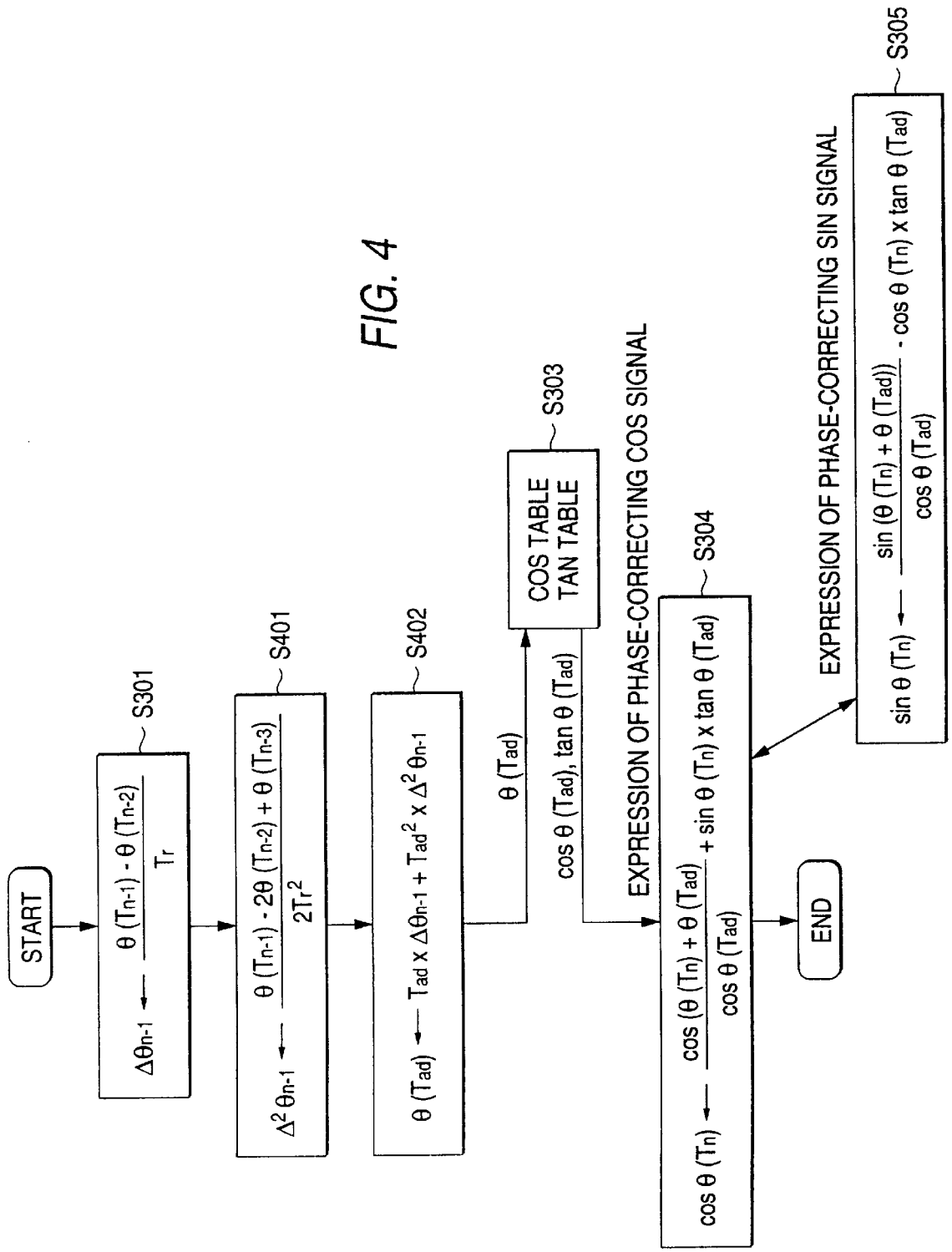
FIG. 4 is a flowchart showing the operation of a phase correction in the position detector according to Embodiment 2 of the invention.

FIG. 4 is a flowchart of a phase correcting process in Embodiment 2 of the invention in which, even during a period when the position detection object is accelerated or decelerated, prediction of a high accuracy can be performed.

In the figure, the processes of the same reference numerals as those of FIG. 3 are performed in the same manner as the case of FIG. 3, and hence their description is omitted.

In step S401, a movement acceleration $\Delta^2\theta_{n-1}$ at the last request time is calculated on the basis of a position data $\theta(T_{n-3})$ which is calculated at the request reception of a thrice preceding time, a position data $\theta(T_{n-2})$ which is calculated at the request reception of a twice preceding time, and a position data $\theta(T_{n-1})$ which is calculated at the request reception of a once preceding time.

In step S402, a moving distance $\theta(T_{ad})$ of the position detection object during A/D conversion of one signal is predicted on the basis of the movement velocity $\Delta\theta_{n-1}$ and the movement acceleration $\Delta^2\theta_{n-1}$.

According to this process, even during a period when the position detection object is accelerated or decelerated, an error of a position data due to a phase lead can be reduced, and the movement distance can be assumed with a high accuracy.

(Embodiment 3 of the Invention)

Figure 5:
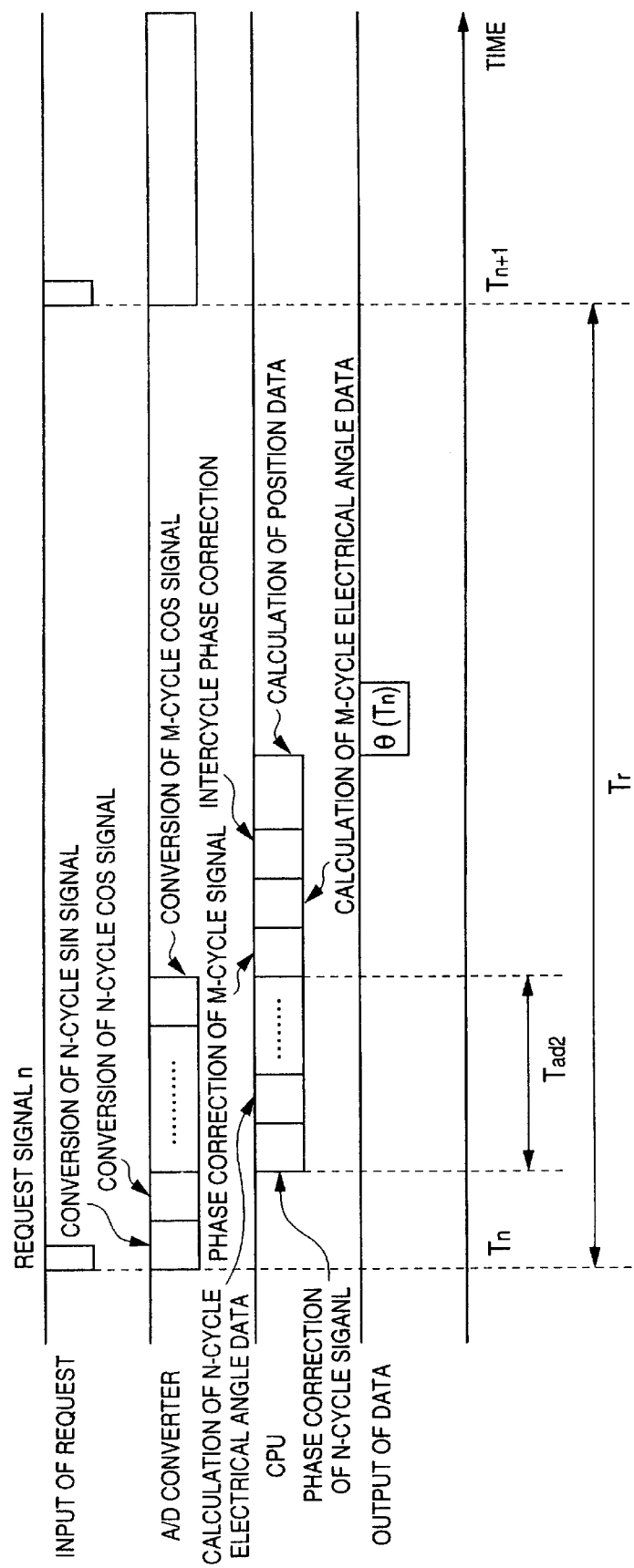
FIG. 5 is a timing chart showing the operation of the position detector according to Embodiments 3 and 4 of the invention.

FIG. 5 is a timing chart showing the operation of the position detector according to Embodiment 3 of the invention which calculates a position data on the basis of plural analog data of different cycles.

In synchronization with a request signal which is sent from an external apparatus and which is shown in the figure, A/D conversion of the analog signal is started.

At the timing when A/D conversion of a SIN signal of N cycles per revolution (hereinafter, referred to merely as N cycles, and N is an integer) and a COS signal of N cycles is ended, a CPU corrects the phase of the COS signal of N cycles by the phase correcting process which has been described in Embodiment 1 of the invention and Embodiment 2 of the invention, and calculates a first electrical angle data $\theta_N(T_n)$ of N cycles, for example, an electrical angle data $\theta_N(T_n)$ of N cycles.

Similarly, the CPU corrects the phase of a COS signal of M cycles per revolution (hereinafter, referred to merely as M cycles, and M is an integer which is smaller than N), and calculates a first electrical angle data of M cycles, for example, an electrical angle data of M cycles.

The electrical angle data of M cycles becomes an electrical angle data $\theta_M(T_n+T_{ad2})$ at a time $(T_n+T_{ad2})$.

Such electrical angle data with different times depending on cycles are corrected by an intercycle phase correcting process which will be described below, and thereafter the electrical angle data are combined to calculate a position data.

Figure 6:
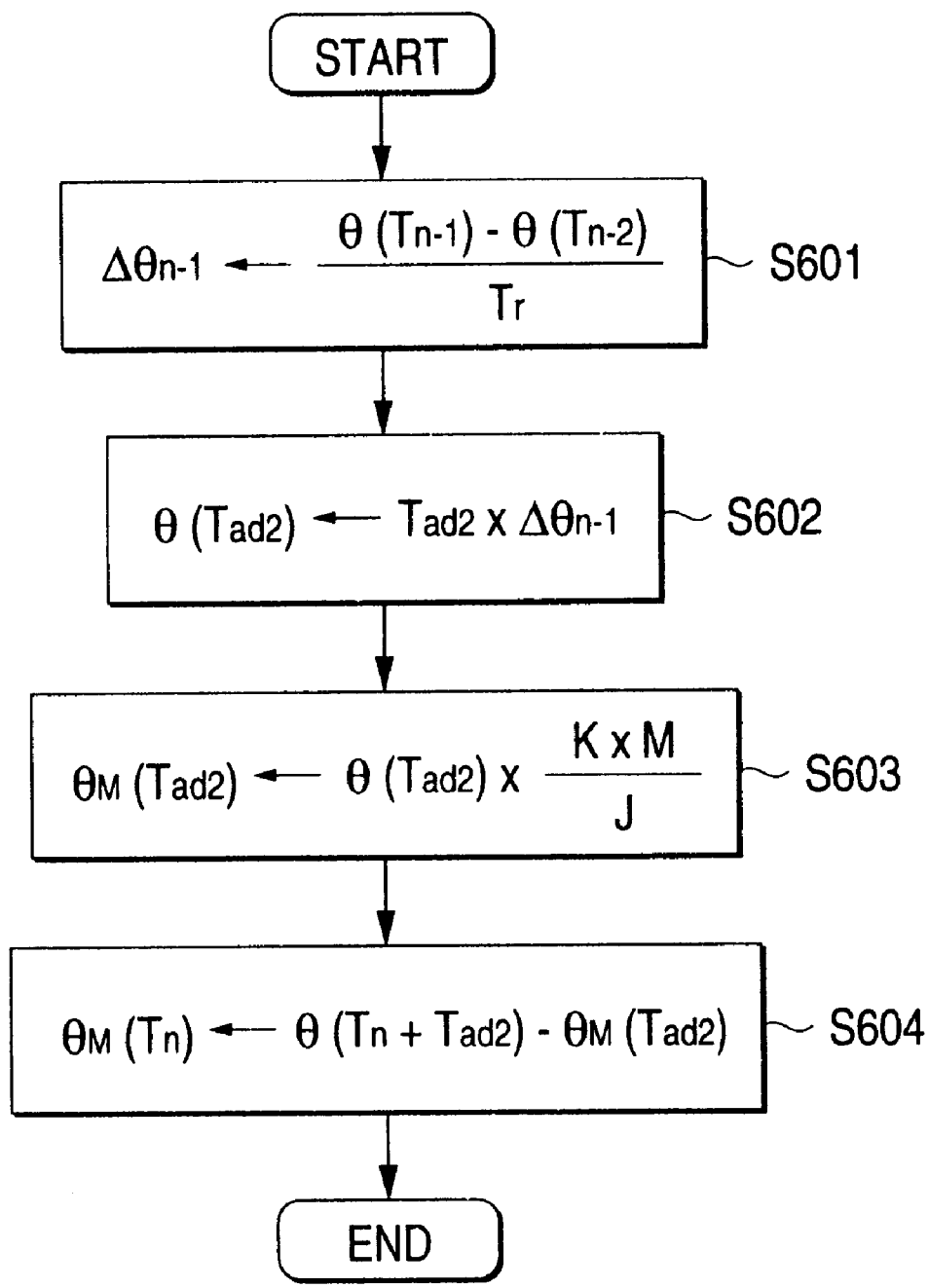
FIG. 6 is a flowchart showing the operation of an intercycle phase correction in the position detector according to Embodiment 3 of the invention.

FIG. 6 is a flowchart of the process of the intercycle phase correction between an electrical angle data of N cycles and an electrical angle data of M cycles.

A movement velocity $\Delta\theta_{n-1}$ at the last time between requests is calculated on the basis of a position data $\theta(T_{n-2})$ which is produced at the request at a twice preceding time, a position data θ($T_{n-1}$) which is produced at the request at a once preceding time, and the cycle $T_r$ of a request from the external apparatus (step S601).

Next, a moving distance θ($T_{ad2}$) in a time period $T_{ad2}$ is predicted on the basis of the movement velocity Δθ$_{n-1}$ at the last time between requests and the time period $T_{ad2}$ from the start of the A/D conversion of the SIN signal of N cycles to the start of the A/D conversion of the SIN signal of M cycles (step S602).

Next, a second electrical angle data of M cycles in the time period $T_{ad2}$, for example, a changing amount of an electrical angle data of M cycles θ$_M$($T_{ad2}$) is calculated on the basis of a moving distance θ($T_{ad2}$) in the time period $T_{ad2}$, a division number J of the position detector, a division number K of the electrical angle data of the signal of M cycles, and M. The division number J and the division number K are integers (step S603).

A third electrical angle data of M cycles which is corrected, for example, an electrical angle data of M cycles θ$_M$($T_n$) is calculated by subtracting the changing amount of an electrical angle data θ$_M$($T_{ad2}$) in the time period $T_{ad2}$ from the electrical angle data of M cycles θ$_M$($T_n$+$T_{ad2}$) before correction (step S604)

As a result of the above correcting process, the phase shift among electrical angle data and due to movement of position detection object during the period of A/D conversion is corrected, and correct synthesis of a position data can be performed.

(Embodiment 4 of the Invention)

Figure 7:
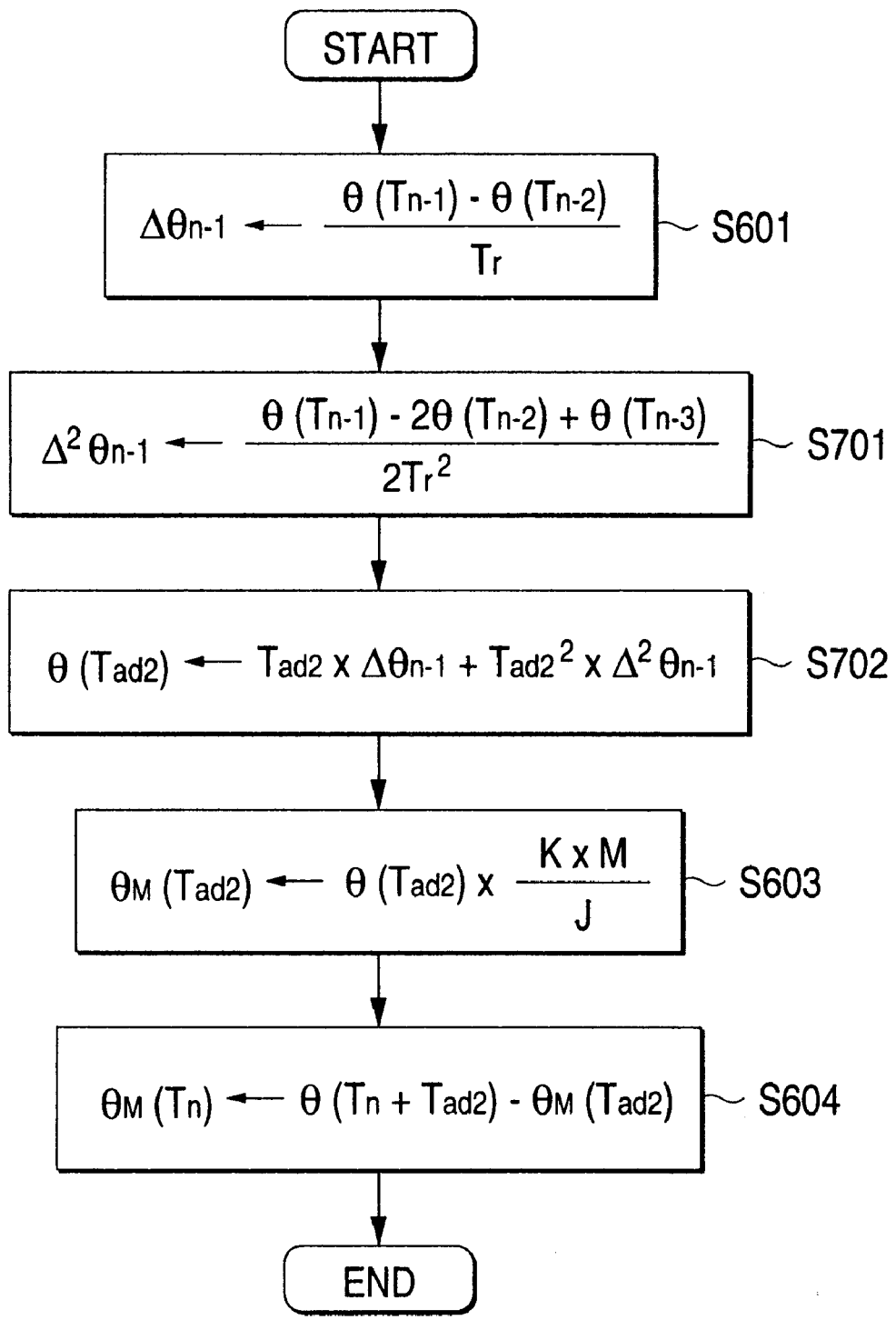
FIG. 7 is a flowchart showing the operation of an intercycle phase correction in the position detector according to Embodiment 4 of the invention.

FIG. 7 is a flowchart of a process of an intercycle phase correction in a position detector according to Embodiment 4 of the invention in which a position data is calculated from plural analog data of different cycles.

In the figure, the processes of the same reference numerals as those of FIG. 6 are performed in the same manner as the case of FIG. 6, and hence their description is omitted.

Step S701 and step S702 are processes for predicting the moving distance θ($T_{ad2}$) in the time period $T_{ad2}$ in the same manner as step S401 and step S402 of FIG. 4. According to the processes shown in FIG. 7, even during a period when the position detection object is accelerated or decelerated, assumption of the moving distance at a higher accuracy can be performed, and the intercycle phase correction is performed at a higher accuracy. Therefore, correct synthesis of a position data can be performed.

(Embodiment 5 of the Invention)

Figure 8:
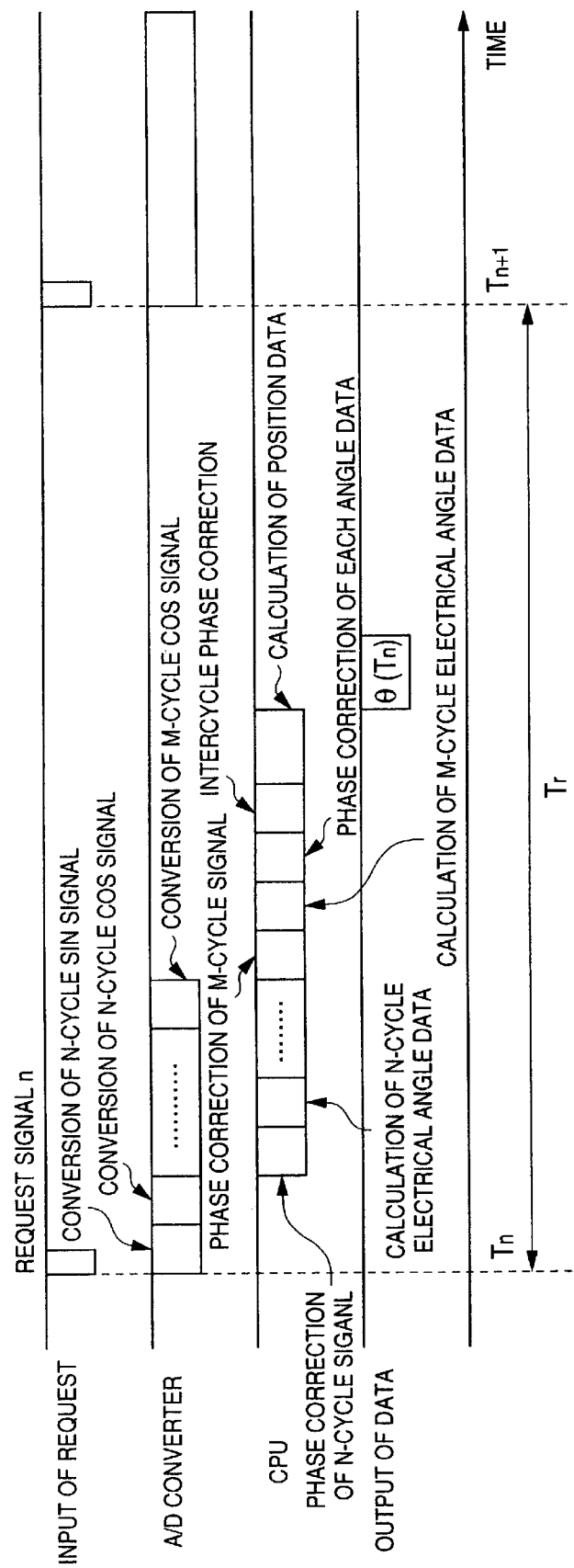
FIG. 8 is a timing chart showing the operation of the position detector according to Embodiments 5 and 6 of the invention.

FIG. 8 is a flowchart of the operation of a position detector according to Embodiment 5 of the invention in which a position data is calculated from plural analog signals of different cycles.

As shown in the figure, A/D conversion of an analog signal is started in synchronization with a request signal which is sent from an external apparatus.

At the timing when A/D conversion of a SIN signal of N cycles and a COS signal of N cycles is ended, a CPU corrects the phase of the COS signal of N cycles by the phase correcting process which has been described in Embodiment 1 of the invention and Embodiment 2 of the invention, and calculates an electrical angle data θ$_N$($T_n$) of N cycles. Similarly, also an electrical angle data of M cycles is calculated.

The analog signals of each cycles are signals in which the phase is caused to lag by the influence of delay elements in the analog signal processing circuit. Therefore, obtained electrical angle data of each cycles lag with respect to true positions.

The phase lags due to the influence of the analog signal processing circuit are corrected by a process of electrical angle data phase correction, the intercycle phase correction which has been described in Embodiment 3 of the invention and Embodiment 4 of the invention is performed, and electrical angle data after correction are combined to calculate a position data.

Figure 9:
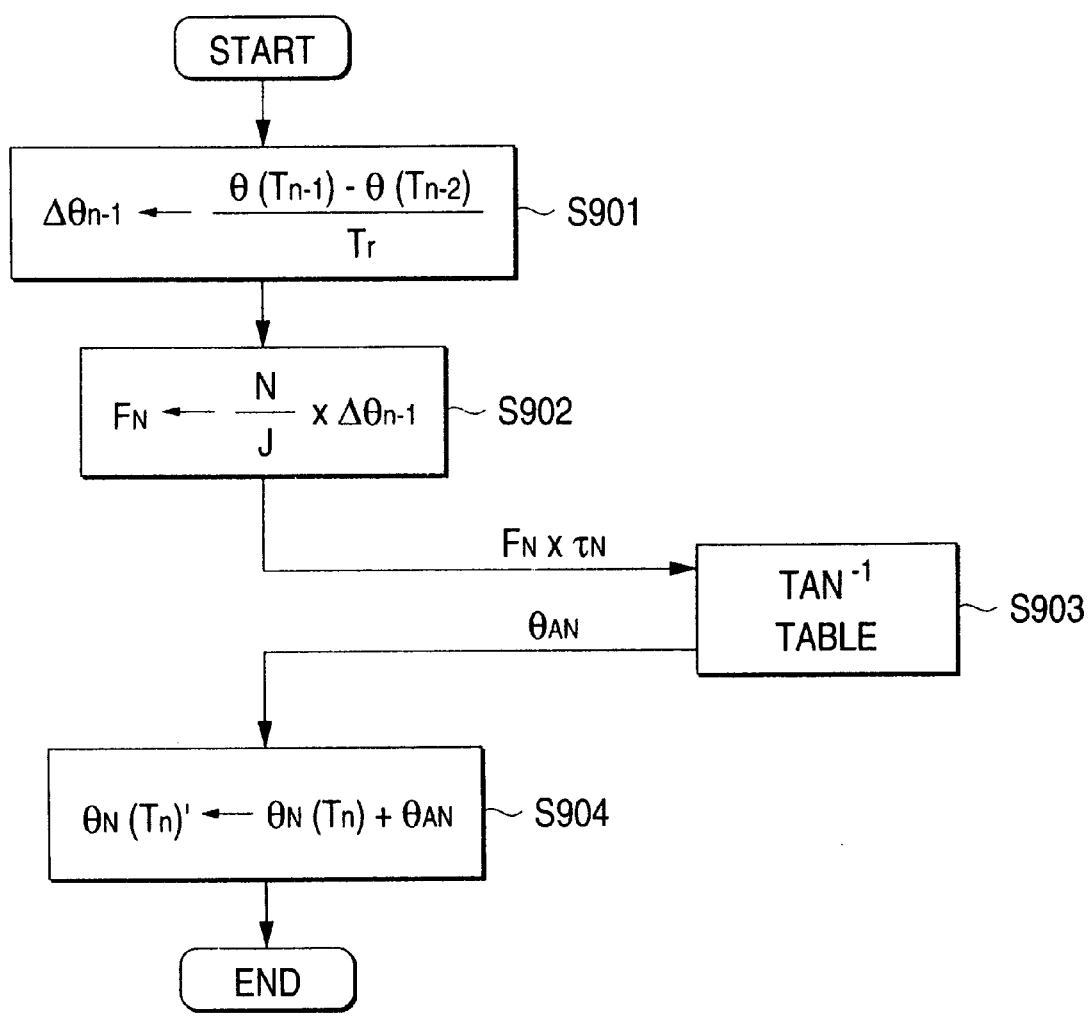
FIG. 9 is a flowchart showing the operation of a phase correction in the position detector according to Embodiment 5 of the invention.

FIG. 9 is a flowchart of the process of the phase correction of an electrical angle data of N cycles. As shown in the figure, a movement velocity Δθ$_{n-1}$ at the last time between requests is first calculated on the basis of a position data θ($T_{n-2}$) which is produced at the request at a twice preceding time, a position data θ($T_{n-1}$) which is produced at the request at a once preceding time, and the cycle $T_r$ of a request from the external apparatus (step S901).

Next, the frequency $F_N$ of the N-cycle signal is predicted on the basis of the movement velocity Δθ$_{n-1}$, the cycle $T_r$ of a request from the external apparatus, N, and J (step S902).

In the calculation expression of step S902, Δθ$_{n-1}$ is the movement velocity at the last time, and its unit is pulse/sec. Since the division number J of the position detector is the number of pulses per revolution of the shaft, (Δθ$_{n-1}$/J) is the number of revolutions of the shaft in the last movement, i.e., the frequency of 1-cycle signal, and (N·Δθ$_{n-1}$/J) is the frequency of the N-cycle signal in the last movement.

With using $F_N$×τ$_N$ as an address, the amount of the phase lag θ$_{AN}$ which depends on the cycle is read out from a TAN$^{-1}$ table in a ROM (step S903).

τ$_N$ is a time constant of an analog circuit. Supposing the case where the time constant is varied in accordance with the frequency, a suffix N is attached.

The phase lag φ$_N$ when the time constant is τ$_N$ is given by:

$$\phi_N = -\tan^{-1}(2\pi f \tau_N).$$

Next, the amount of the phase lag θ$_{AN}$ is added to the electrical angle data θ$_N$($T_n$) which lags with respect to the above-mentioned true position, thereby calculating a corrected electrical angle data θ$_N$($T_n$)' (step S904).

In this way, a lag of an electrical angle data due to a cause of a lag in an analog signal processing circuit is corrected, and correct synthesis of the position data can be performed.

The process of correcting the phase of an electrical angle data enables even a position detecting apparatus which processes an analog signal of a higher frequency, to use a filter or the like in order to stabilize an analog signal processing circuit without impairing the accuracy. Furthermore, an effect is attained that it is not necessary to use electronic parts which are expensive, and fast in response speed.

(Embodiment 6 of the Invention)

Figure 10:
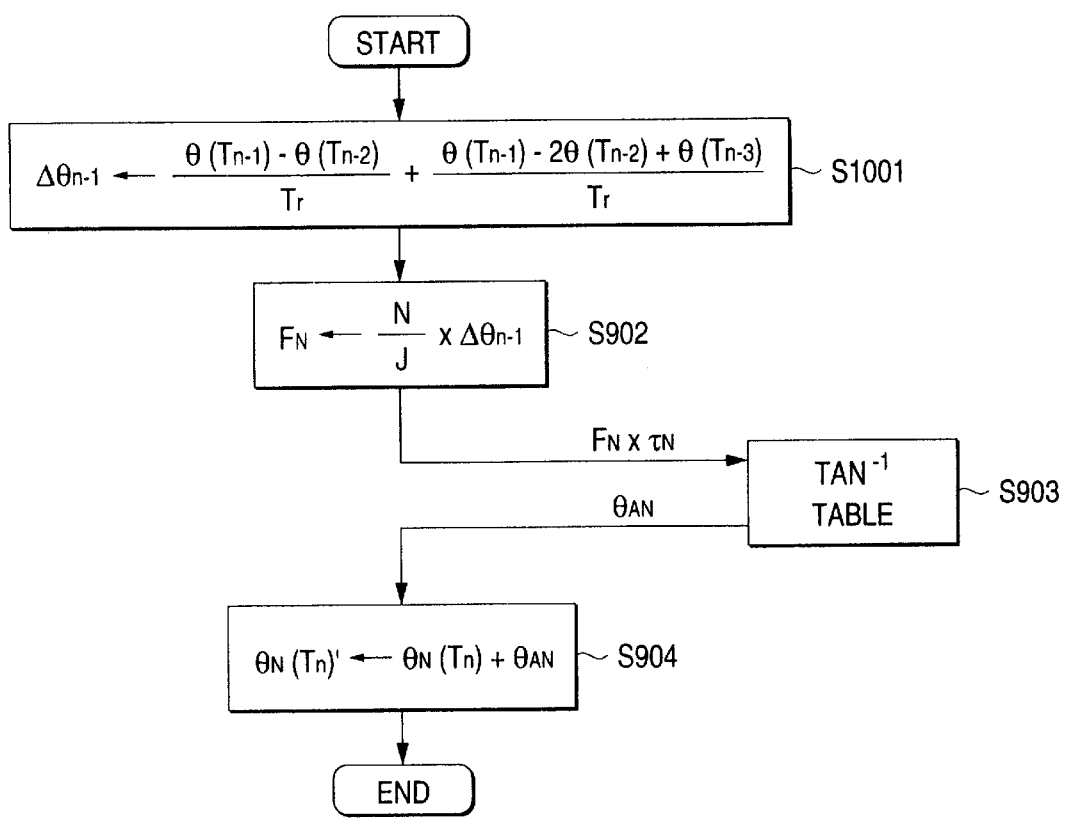
FIG. 10 is a flowchart showing the operation of a phase correction in the position detector according to Embodiment 6 of the invention.
Figure 11:
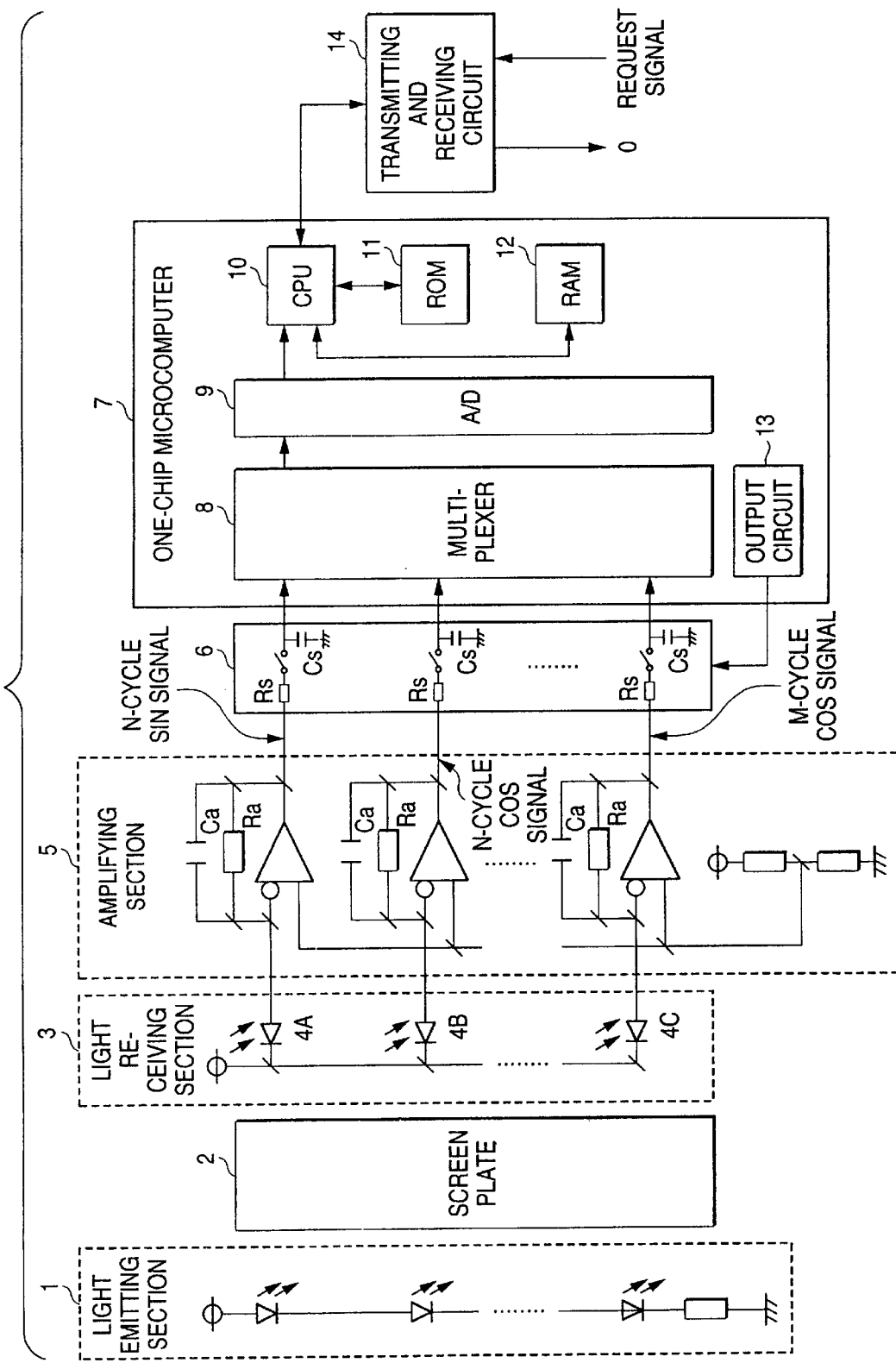
FIG. 11 is a block diagram showing a conventional position detector.
Figure 12:
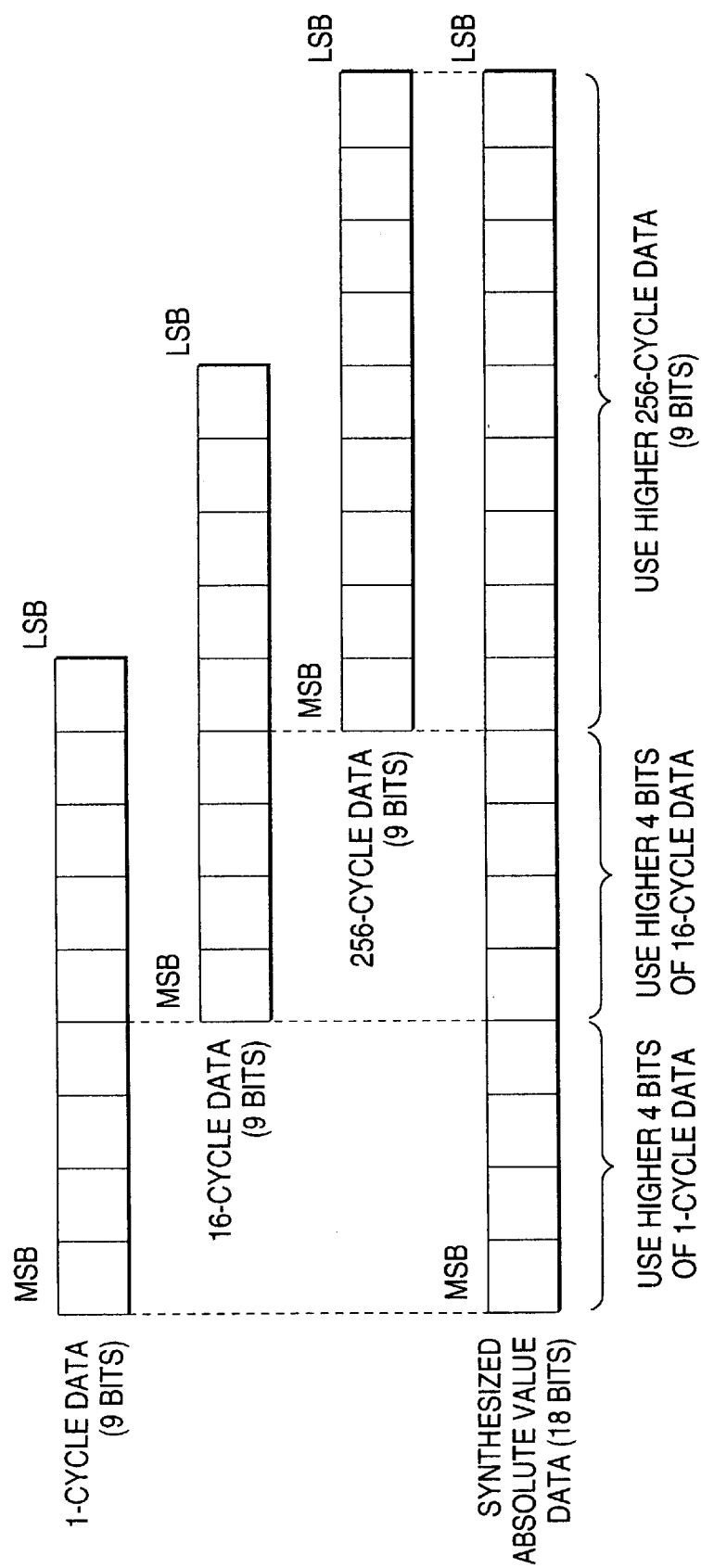
FIG. 12 is a view illustrating preparation of an absolute position data in the conventional position detector.
Figure 13:
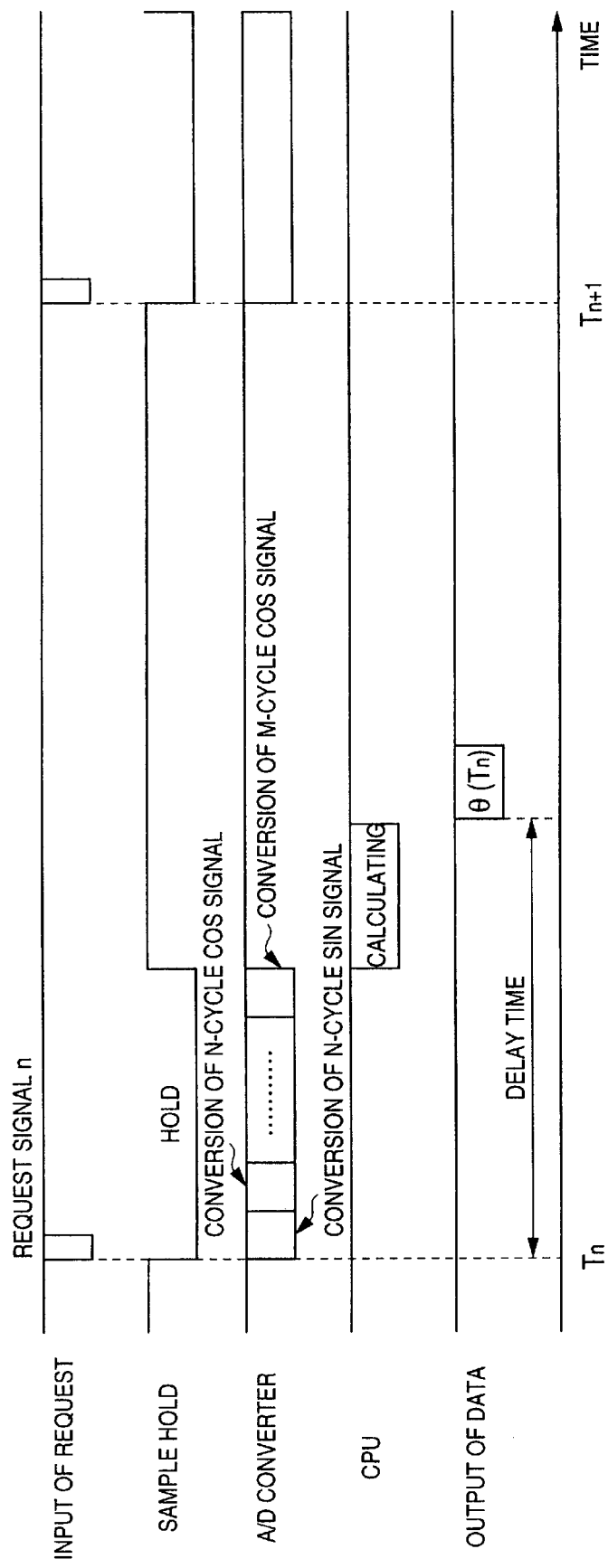
FIG. 13 is a timing chart showing the operation of the conventional position detector.

FIG. 10 is a flowchart of an electrical angle data phase correcting process for an electrical angle data of N cycles in a position detector according to Embodiment 6 of the invention in which a position data is calculated from plural analog signals of different cycles.

In the figure, the processes of the same reference numerals as those of FIG. 9 are performed in the same manner as the case of FIG. 9, and hence their description is omitted.

Step S1001 is a process of predicting more correctly the movement velocity Δθ$_{n-1}$ at the present time.

According to the processes shown in FIG. 10, even during a period when the position detection object is accelerated or decelerated, the amount of a lag of an electrical angle data of N cycles produced by a cause of a lag in an analog signal processing circuit is corrected, and correct synthesis of a position data can be performed.

As described above, the position detecting apparatus of the invention is useful in the case where correct position detection must be performed at a low cost in various apparatuses such as a positioning control apparatus for a control object that is moved at a high speed.

What is claimed is:

1. A position detecting apparatus comprising:
    signal generating means for generating sinusoidal and cosinusoidal signals in response to movement of a position detection object;
    A/D converting means for converting the sinusoidal and cosinusoidal signals which are generated by said signal generating means, into digital data on the basis of reception of a request signal from an external apparatus; and
    calculating means for assuming an amount of a phase shift between a digital data of the sinusoidal signal and a digital data of the cosinusoidal signal, the phase shift being produced by movement of the position detection object during A/D conversion performed by said A/D converting means, on the basis of a movement velocity at a last time which is calculated from a difference between position data in request receptions at a twice preceding time and a once preceding time, for correcting a phase of one of the digital data of the sinusoidal signal and the digital data of the cosinusoidal signal, and for calculating a position data at a present time on the basis of the digital data the phase of one of which is corrected.

2. The position detecting apparatus according to claim 1, wherein said calculating means assumes the amount of the phase shift for each pair by using movement acceleration at the last time which is calculated from a difference between movement velocity at a time immediately before the last time, and the movement velocity at the last time, the movement velocity at the time immediately before the last time being calculated from a difference between position data in request receptions at a thrice preceding time and the twice preceding time.

3. The position detecting apparatus according to claim 1, wherein said calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and calculates the position data at the present time by further using a result of the prediction.

4. The position detecting apparatus according to claim 1, wherein said calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and movement acceleration at the last time which is calculated from a difference between movement velocity at a time immediately before the last time, and the movement velocity at the last time, the difference between movement velocity at the time immediately before the last time being calculated from a difference between position data in request receptions at a thrice preceding time and the twice preceding time, and calculates the position data at the present time by further using a result of the prediction.

5. A position detecting apparatus comprising:
    signal generating means for generating a plurality of signal pairs consisting of a sinusoidal signal and a cosinusoidal signal, at different cycles in response to movement of a position detection object;
    A/D converting means for sequentially converting the signals of the signal pairs into digital data on the basis of reception of a request signal from an external apparatus; and
    calculating means for correcting a phase difference between the digital data of the signal pairs on the basis of a movement velocity at a last time which is calculated from a difference between position data in request receptions at a twice preceding time and a once preceding time, the phase difference being produced during an A/D conversion time of one signal of the signal pair, for calculating a first electrical angle data on the basis of the digital data of the corrected signal pair, for calculating a second electrical angle data on the basis of the movement velocity at the last time, the second electrical angle data indicating a moving distance of a position detection object during a time period from reception of the request signal to A/D conversion of the signal pair, for performing a process of obtaining a third electrical angle data on the basis of the first and second electrical angle data, on each of the signal pairs, and for calculating a position data at a present time on the basis of a result of the process.

6. The position detecting apparatus according to claim 5, wherein said calculating means assumes the amount of the phase shift for each pair by using movement acceleration at the last time which is calculated from a difference between movement velocity at a time immediately before the last time, and the movement velocity at the last time, the difference between movement velocity at the time immediately before the last time being calculated from a difference between position data in request receptions at a thrice preceding time and the twice preceding time.

7. The position detecting apparatus according to claim 5, wherein said calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and calculates the position data at the present time by further using a result of the prediction.

8. The position detecting apparatus according to claim 5, wherein said calculating means predicts a phase lag data of an analog signal produced by a cause of a phase lag in an analog signal processing circuit at the last time, on the basis of the movement velocity at the last time which is calculated from the difference between position data in request receptions at the twice preceding time and the once preceding time, and movement acceleration at the last time which is calculated from a difference between movement velocity at a time immediately before the last time, and the movement velocity at the last time, the difference between movement velocity at the time immediately before the last time being calculated from a difference between position data in request receptions at a thrice preceding time and the twice preceding time, and calculates the position data at the present time by further using a result of the prediction.

9. The position detecting apparatus according to claim 5, wherein said calculating means performs a weighting process on each of the calculated third electrical angle data in accordance with the cycle, and superposes results of the processes to calculate the position data at the present time.

10. The position detecting apparatus according to claim 9, wherein said calculating means assumes the amount of the phase shift for each pair by using movement acceleration at the last time which is calculated from a difference between movement velocity at a time immediately before the last time, and the movement velocity at the last time, the difference between movement velocity at the time immediately before the last time being calculated from a difference between position data in request receptions at a thrice preceding time and the twice preceding time.

* * * * *